United States Patent [19]

Sansone

[11] Patent Number: 5,694,497
[45] Date of Patent: Dec. 2, 1997

[54] INTRINSICALLY SELF DEFORMING FIBER OPTIC MICROBEND PRESSURE AND STRAIN SENSOR

[75] Inventor: Louis E. Sansone, North Kingstown, R.I.

[73] Assignee: The United States of America as represented by the Secretary of the Navy, Washington, D.C.

[21] Appl. No.: 491,692

[22] Filed: Jun. 19, 1995

[51] Int. Cl.$^6$ ........................................ G02B 6/36
[52] U.S. Cl. ...................... 385/13; 385/12; 250/227.14
[58] Field of Search ................... 385/13, 12; 250/227.14

[56] References Cited

U.S. PATENT DOCUMENTS

| | | | |
|---|---|---|---|
| 4,795,232 | 1/1989 | Persson | 385/13 |
| 4,950,883 | 8/1990 | Glenn | 250/227.14 |
| 5,193,129 | 3/1993 | Kramer | 385/13 |

*Primary Examiner*—Rodney B. Bovernick
*Assistant Examiner*—Yisun Song
*Attorney, Agent, or Firm*—Michael J. McGowan; Prithvi C. Lall; Michael F. Oglo

[57] ABSTRACT

The present invention relates to a sensor for measuring pressure and strain. The sensor is formed by an optical fiber having at least one section wherein the fiber is twisted about itself. The at least one twisted section acts as an intrinsically self-deforming microbend deformer. The sensor further includes a source of light attached to a first end of the fiber and a power meter for measuring the amount of light lost in the at least one section. The optical fiber may have multiple twisted sections with different twist pitches and thus different sensitivities. In an alternative embodiment, the sensor may have two optical fibers twisted about each other.

15 Claims, 2 Drawing Sheets

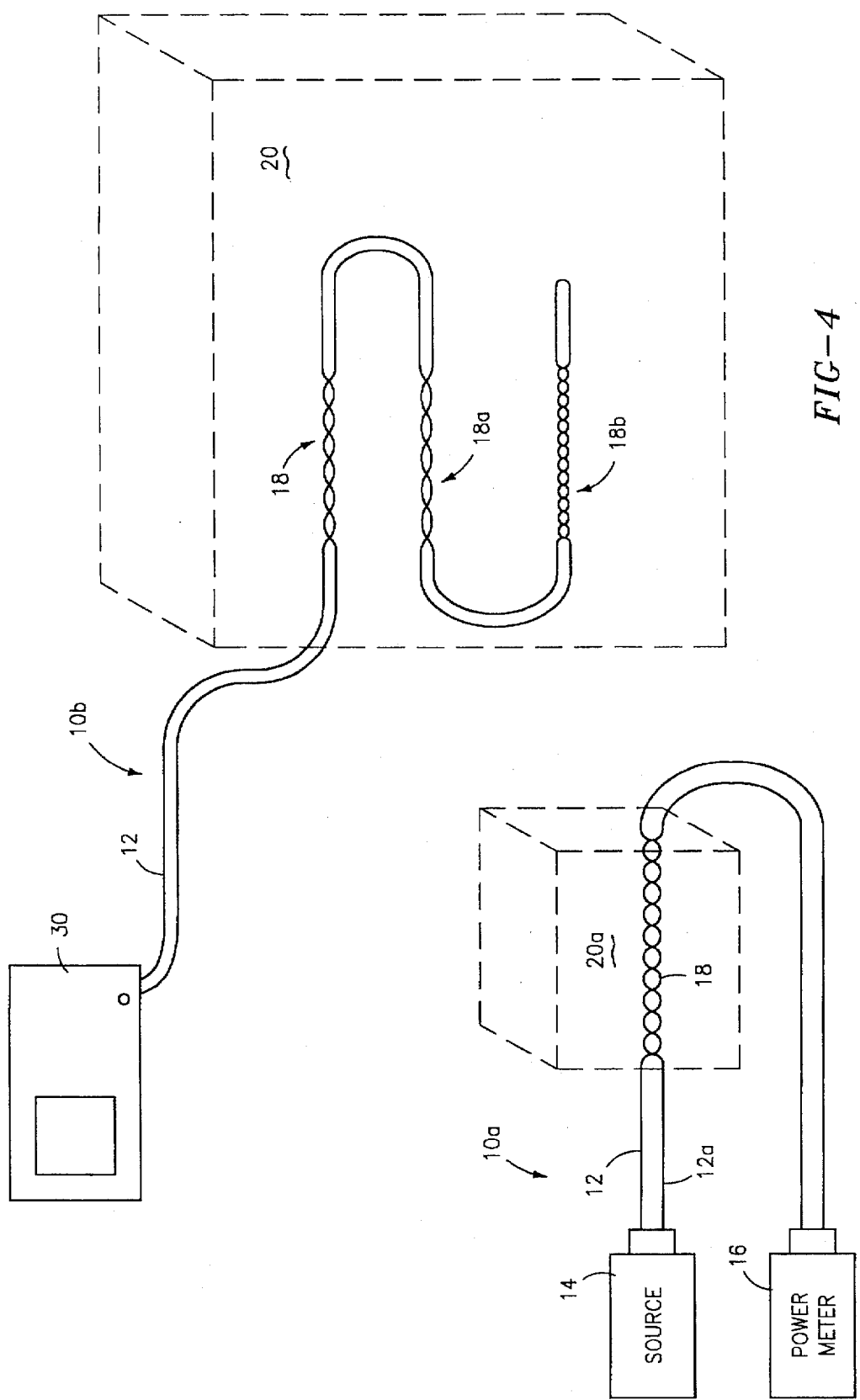

INTRINSICALLY SELF DEFORMING FIBER OPTIC MICROBEND PRESSURE AND STRAIN SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to an optical fiber sensor for measuring pressure and strain. The sensor is of very small diameter, temperature insensitive, inexpensive and easily constructed and can be placed in situ in thin composite materials and unusual materials such as ice.

(2) Description of the Prior Art

Optical fibers in general are known in the prior art. They typically comprise a transparent core of a suitable glass or plastic material which is carried within a relatively thin cylindrical cladding having an index of refraction less than the refractive index of the core. When a light signal is focussed upon one end of the fiber, the fiber core functions as a waveguide to transmit or propagate the light signal through the core with relatively small internal intensity losses or transmission of the signal to the cladding.

Optical fibers, because of their properties such as not being disturbed by electromagnetic interference, have been incorporated into sensing devices. U.S. Pat. No. 4,947,693 to Szuchy et al. and U.S. Pat. No. 5,201,015 to van Bieren et al. illustrate strain sensors incorporating optical fibers. In Szuchy et al., the sensor comprises a length of optical fiber disposed adjacent to a structural surface for sensing the load applied to the surface. The optical fiber is connected to a light source and to a light detector. The optical fiber includes at least one curved portion deformable in response to the applied load. The curved portion is dimensioned such that the light passing through the optical fiber is attenuated in linear relation to the deformation of the curved portion in response to the load applied to the surface. The van Bieren et al. strain sensor includes a length of optical fiber attached to a flexible base plate at two spaced apart locations. The portion of the fiber between the two points of connection is under a bias tension. An interferometer is formed in the tensioned portion of the optical fiber. The sensor is mounted on a surface and changes in interference patterns output by the interferometer are monitored to measure strain in the surface.

U.S. Pat. No. 5,056,884 to Quinton, Jr. relates to a transverse load sensitive optical treadle switch which includes a deformable longitudinal housing and an optical fiber assembly positioned within the housing. The optical fiber assembly includes an optical fiber which is subject to bending upon application of a transverse load to the housing and which is connected to a source of light. As the fiber is bent, a significant decrease in the passage of light through the fiber occurs.

U.S. Pat. No. 5,193,129 to Kramer relates to a pressure detector including an optical fiber cable woven through a ladder like structure which is encapsulated and surrounded by a cover. Light transmitted through the optical fiber cable is diminished to a value less than a threshold value upon the occurrence of microbending caused by pressure applied at any location along the length thereof. The rungs of the ladder structure are sized and spaced to provide a proper locus about which microbending may be produced. One of the deficiencies of this sensor is that it must use part of the structure it is embedded in to complete the sensor design. In fact, the utility of this type of sensor is limited in that it must be woven into the substrate or structure being measured and cannot be later repositioned as needed. Another deficiency of this sensor is that it is not omnidirectional in its sensitivity.

U.S. Pat. No. 5,293,039 to Mongiols relates to an optical fiber pressure detector comprising a mat having an optical fiber running therethrough along a path with no fiber—fiber crossovers. The fiber is connected to a light source and a light receiver. The light receiver recovers light flux transmitted by the optical fiber and indicates any changes to which the flux is subjected because of deformation to the optical fiber caused by a pressure force being applied to the mat. The optical fiber is mounted on a support sheet made of plastic and passes back and forth through the support sheet via through holes. The support sheet is sandwiched between two other sheets of greater or lesser rigidity depending on the sensitivity desired for the detector mat.

The foregoing sensors do not lend themselves to detecting pressure fields in composite materials and unusual materials such as ice. Still further, they have cold weather limitations which do not permit them to operate in extreme cold environments.

SUMMARY OF THE INVENTION

Accordingly, it is an object of the present invention to provide a sensor which can be used to detect pressure fields in composite materials and unusual materials such as ice.

It is a further object of the present invention to provide a sensor as above which is immune to temperature variations and does not suffer from cold weather limitations.

It is yet another object of the present invention to provide a sensor as above which is simply constructed and has self-deforming properties.

It is yet another object of the present invention to provide a sensor which has different sensitivities contained in a single structure.

The foregoing objects are attained by the intrinsically self deforming fiber optic microbend pressure and strain sensor of the present invention. The sensor of the present invention in a first embodiment is formed by an optical fiber having at least one sensing section wherein the fiber is twisted about itself so that portions of the fiber are wound about each other. This at least one twisted sensing section acts as an intrinsically self-deforming microbend deformer. The optical fiber is connected at one end to a means for passing light through the fiber and at a second end to a means for measuring the amount of light lost when the fiber is bent during load conditions. The measured amount of light indicates the amount of pressure or strain being applied to a composite material or other material with which the sensor cooperates. The optical fiber may have multiple twisted sensing sections with different twist pitches so as to provide a sensor with multiple sensitivities. Twist pitch is defined as the distance between two adjacent identical points on a twisted optical fiber.

In an alternative embodiment, the sensor of the present invention comprises two optical fibers wound about each other to form one or more sensing sections.

Other details of the sensor of the present invention, as well as other objects and advantages, are set forth in the following description and drawings wherein like reference numerals depict like elements.

BRIEF DESCRIPTION OF THE DRAWINGS

FIG. 3 illustrates a second embodiment of a sensor in accordance with the present invention incorporating two optical fibers; and FIG. 4 illustrates a third embodiment of a sensor in accordance with the present invention.

DETAILED DESCRIPTION OF THE PREFERRED EMBODIMENT(S)

Figure 1:
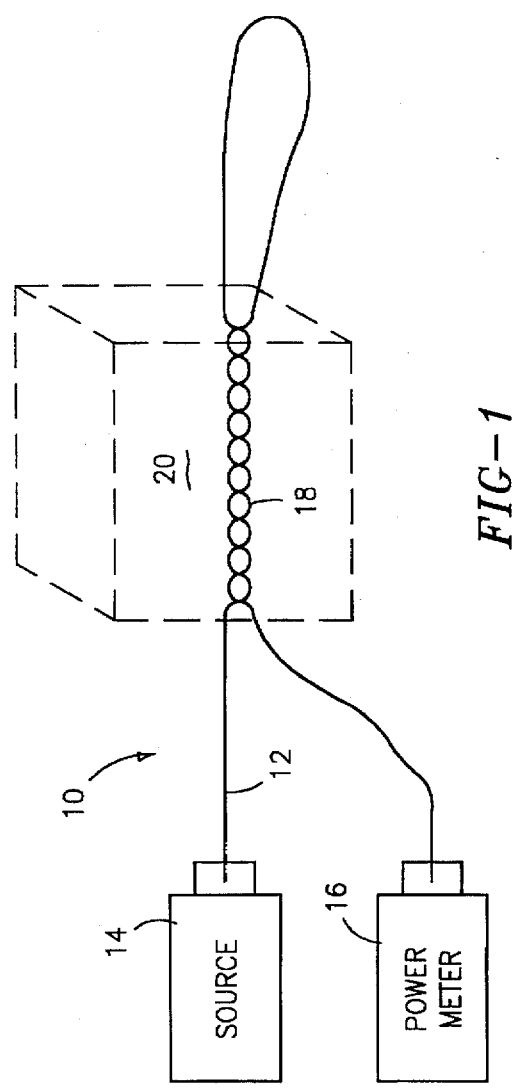
FIG. 1 illustrates a first embodiment of a sensor in accordance with the present invention.

Referring now to the drawings, FIG. 1 illustrates a pressure and/or strain sensor in accordance with the present invention. The sensor 10 has a single optical fiber 12. The fiber 12 may be any suitable single mode or multi-mode fiber known in the prior art. The fiber has a first end connected to a source 14 of light such as a laser. The source 14 transmits light through the fiber 12. A second end of the fiber is connected to a receiver or measuring means 16 for measuring the amount of light lost due to bending in the fiber 12 as a result of an applied load. The measuring means 16 could be a power meter or a light detector.

The fiber 12 is provided with a sensing portion or section 18 wherein the fiber is twisted or wound about itself. As used herein, the word "twisted" means that portions of the fiber are bent about an axis, such as a longitudinal axis of the optical fiber or an axis parallel to a longitudinal axis of the optical fiber, so as to overlap each other in a series of figure eight like configurations. The sensing section 18, in use, acts as an intrinsically self-deforming microbend deformer. It is positioned within the area 20 to be measured.

Figure 2:
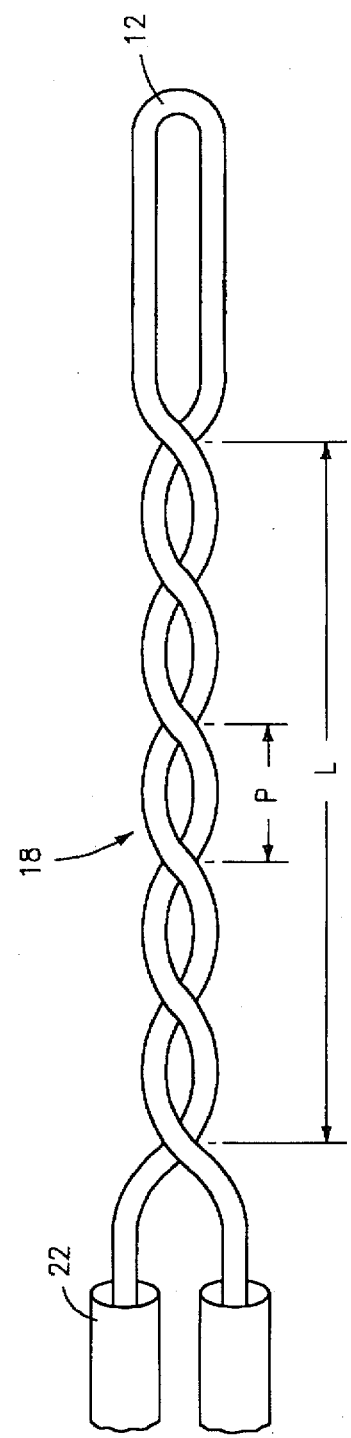
FIG. 2 illustrates a portion of the optical fiber used in the sensor of FIG. 1.

FIG. 2 illustrates a magnified view of the sensing section 18. As shown therein, the sensing section 18 may have a desired length L and a desired twist pitch P. It is the twist pitch P which determines the sensitivity of the section 18. For example, if the section 18 is provided with a loose twist pitch of about 2 twists per inch, then it will have a relatively low sensitivity, i.e., there is less loss of light from the source as measured by the receiver 16. If the section 18 is provided with a tight twist pitch in the range of from about 8 to about 10 twists per inch, then the section 18 will have a higher sensitivity. The length L of section 18 is a function of the twist pitch. It has been found that a minimum twist length of two twists works satisfactorily. In use, the length of the twisted section and the pitch may be determined empirically.

If desired, the fiber 12 may be provided with a coating 22 to provide protection from environmental conditions. The coating may comprise any suitable type of coating which will allow it to perform in a sensing environment. For example, the coating 22 may be a relatively thin plastic coating. Preferably, the coating is present only in the unused length (not-twisted) part of the fiber 12.

The sensor 10 works on the microbend principle which allows the fiber 12 to leak light out when it is microbent. The more severe the microbending, the more light is lost from the fiber. The measuring means 16 such as a power meter first measure the light transmitted before any deformation has happened (unloaded condition). The net loss of light during loading conditions, where radial strain or pressure cause more and more microbending of the twisted fiber section, is measured by the receiver 16.

FIG. 3 illustrates an alternative embodiment of a sensor in accordance with the present invention. The sensor 10a includes two optical fibers 12 and 12a. As before, each fiber may be a single mode or multi mode optical fiber. Additionally, each fiber is connected at one end to a light source 14 and at a second end to a measuring device 16 such as a power meter. The sensing section of portion 18 of the sensor 10a is formed by twisting the fibers 12 and 12a about each other. The length L of the sensing portion 18 is determined in part by the dimensions of the area 20a to be monitored. As before, the sensitivity of the sensing portion 18 is determined by the twist pitch. The sensor 10a operates on the same microbend principle as the sensor 10.

FIG. 4 shows yet another sensor 10b. The sensor 10b differs from the sensor 10 in that it has three sensing portions 18, 18a and 18b, each formed by twisting the fiber 12 about itself. The sensing portion 18 may have a twist pitch which operates as a medium pressure sensor. The sensing portion 18a may have a twist pitch which operates at a low pressure sensor. Finally, the sensing portion 18b may have a twist pitch which operates as a high pressure sensor. As before, the length of each portion 18, 18a and 18b is determined in part by the dimensions of the area 20 to be monitored.

In the sensor embodiment of FIG. 4, a high quality commercial optical time domain reflector (OTDR) 30 is connected to the fiber 12 to interrogate the fiber. When using an OTDR for multiple sensor applications, the loss of light for each sensing portion 18, 18a and 18b during loading and unloaded conditions is compared.

Several advantages are realized with the sensor design of the present invention. First, the sensors have a relatively small size which allows in situ use of the sensors without compromising the integrity of any composite material whose loading is to be measured. The small size of the sensors allows many sensors to be physically located near each other for precise field measurements. The small size also allows thin sections to be interrogated without compromising the shape of a part whose loading is being measured.

The simple design of the sensor of the present invention allows for easy field construction of the sensor and a low cost per sensor. The simple operating principle of the sensor also allows for low-cost power meter measurements to be used.

The sensors of the present invention are temperature insensitive and can be used over a wide range of temperatures, i.e. −60° F. to +580° F. Additionally, the sensor is immune to electromagnetic interference (EMI) and radio frequency interference (RFI).

Finally, the flexible nature of the sensor of the present invention allows for easy placement of the sensor in almost any location and orientation.

If desired, the sensor of the present invention can be constructed of many fibers bundled together in a trunk cable and then fanned out and twisted to form sensors in the sensor location.

If desired, the optical fiber(s) of the sensors of the present invention may be twisted on any suitable material which has the ability to microbend the sensing fiber.

In use, the fiber may be mounted in the area to be monitored in any desired manner.

It is apparent that there has been provided in accordance with this invention an intrinsically self deforming fiber optic microbend pressure and strain sensor which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A sensor for measuring pressure or strain, said sensor consisting of an optical fiber having a longitudinal axis and at least one sensing section formed by portions of said fiber being wound about said longitudinal axis so that said portions of said fiber are overlap each other in a series of helically wound figure eight configurations and wherein said at least one sensing section acts as an intrinsically self-deforming microbend deformer.

2. The sensor of claim 1 wherein said at least one sensing section has a desired length and a twist pitch of at least two twists per inch of length.

3. The sensor of claim 1 wherein said at least one sensing section has a desired length and a twist pitch of from about 8 to about 10 twists per inch.

4. The sensor of claim 1 further comprising means for protecting said fiber from environmental conditions surrounding said fiber.

5. The sensor of claim 1 wherein said fiber having first and second ends further comprises:

means for passing light through said fiber connected to said first end; and means for measuring light lost when said fiber is bent during load conditions attached to said second end.

6. The sensor of claim 1 wherein said fiber having at least two sensing sections where said fiber is twisted about itself and said sensing sections having different twist pitches so as to provide said sensor with different sensitivities.

7. The sensor of claim 6 wherein said fiber has a first sensing section with a relatively low twist pitch for measuring a low pressure, a second sensing section with a twist pitch higher than said twist pitch for said first section for measuring a medium pressure, and a third sensing section with a twist pitch higher than the twist pitch of said second sensing section for measuring a high pressure.

8. The sensor of claim 6 further comprising means for measuring an amount of light lost in each sensing section when said fiber is in a loaded condition and means for comparing said measured amount of light lost with the amount of light lost in each sensing section when said fiber is in an unloaded condition.

9. The sensor of claim 1 wherein said fiber is a single mode fiber.

10. The sensor of claim 1 wherein said fiber is a multi-mode fiber.

11. A sensor for measuring pressure or strain, which sensor is substantially immune to temperature variations, said sensor consisting of:

first and second optical fibers;

said first and second optical fibers extending along an axis; and said first and second optical fibers being helically wound about each other and about said axis so as to form a sensing section having a length commensurate with an area to be monitored.

12. The sensor of claim 11 further comprising said twisted fibers being twisted for a desired length and at a twist pitch of at least two twists per inch.

13. The sensor of claim 11 further comprising:

means for passing light through said fibers; and means for measuring the amount of light lost as a result of bending of said optical fibers under load conditions.

14. The sensor of claim 11 wherein each fiber is a single mode fiber.

15. The sensor of claim 11 wherein each fiber is a multi-mode fiber.

* * * * *